United States Patent [19]
Levine et al.

[11] Patent Number: 5,835,702
[45] Date of Patent: Nov. 10, 1998

[54] PERFORMANCE MONITOR

[75] Inventors: Frank Eliot Levine; Charles Philip Roth; Edward Hugh Welbon, all of Austin, Tex.

[73] Assignee: International Business Machines Corporation, Armonk, N.Y.

[21] Appl. No.: 734,335

[22] Filed: Oct. 21, 1996

[51] Int. Cl.$^6$ ................................................ G01B 21/00
[52] U.S. Cl. .................................... 395/183.15; 702/737
[58] Field of Search ..................... 395/183.15, 183.02, 395/183.21, 183.11, 183.14, 184.01, 182.18, 412, 569; 364/551.01

[56] References Cited

U.S. PATENT DOCUMENTS

| | | | |
|---|---|---|---|
| 3,906,454 | 9/1975 | Martin .................................. | 340/172.5 |
| 5,426,741 | 6/1995 | Butts, Jr. et al. ...................... | 395/325 |
| 5,446,876 | 8/1995 | Levine et al. ........................ | 395/184.01 |
| 5,537,541 | 7/1996 | Wibecan ............................. | 395/183.21 |
| 5,557,548 | 9/1996 | Gover et al. ......................... | 364/551.01 |
| 5,581,482 | 12/1996 | Wiedenman et al. .............. | 364/551.01 |
| 5,657,253 | 8/1997 | Dreyer et al. ....................... | 364/551.01 |

OTHER PUBLICATIONS

U.S. Patent application Ser. No. 08/497,242 entitled "Method and System for Halting Processor Execution in Response to an Enumerated Occurrence of a Selected Combination of Internal States".
U.S. Patent application Ser. No. 08/485,953 entitled "On–Chip Performance Monitoring with a Cheracterization of Locks/Semaphore Utilization".
U.S. Patent application Ser. No. 08/537,586 entitled "A Method and System for Performance Monitoring Through Identification of Frequency and Length of Time of Execution of Serialization Instructions in a Processing System".
U.S. Patent application Ser. No. 08/537,645 entitled "A Method and System for Perfomance Monitoring Through Monitoring an Order of Processor Events During Execution in a Processing System".
U.S. Patent application Ser. No. 08/538,071 entitled "A Method and System for Selecting and Distinguishing an Event Sequence Using an Effective Address in a Processing System".
U.S Patent application Ser. No. 08/539,023 entitled "A Method and System for Performance Monitoring Time Lenghts of Disabled Interrupts in a Processing System".
U.S. Patent application Ser. No. 08/538,102 entitled "A Method and System for Performance Monitoring Stalls to Identify Pipeline Bottlenecks and Stalls in a Processing System".
U.S. Patent application Ser. No. 08/538,509 entitled "A Method and System for Performance Monitoring Efficiency of Branch Unit Operation in a Processing System".
U.S. Patent application Ser. No. 08/536,492 entitled "A Method and System for Performance Monitoring of Misaligned Memory Accesses in a Processing System".
U.S. Patent application Ser. No. 08/538,774 entitled "A Method and System for Performance Monitoring of Dispatch Stalls in a Processing System".
U.S. Patent application Ser. No. 08/538,070 entitled "A Method and System for Performance Monitoring of Dispatch Unit Efficiency in a Processing System".
U.S. Patent Application Ser. No. 08/675,427 entitled "Performance Monitoring in a Multiprocessor System with Interrupt Masking" (which is a file wrapper continuing application of USSN 08/358,220).
U.S. Patent application Ser. No. 08/537,417 entitled "A Method and System for Performance Monitoring Time Lengths of Instruction Execution in a Processing System".

*Primary Examiner*—Ly Hua
*Attorney, Agent, or Firm*—Kelly K. Kordzik; Winstead Sechrest & Minick P.C.; Anthony V. S. England

[57] ABSTRACT

A method and system for performing performance monitoring within a data processing system whereby a counting function to be performed by a particular counter within the performance monitor is dependent upon a particular event programmed within another counter within the performance monitor so that reprogramming of all code points for each performance counter is not required.

6 Claims, 8 Drawing Sheets

FIG. 3

| BUFFER NUMBER | INSTRUCTION TYPE / EXECUTION UNIT | #GPR DEST. | #FPR DEST. | FINISHED | EXCEPTION |
|---|---|---|---|---|---|
| 0 | 22 | 1 | 0 | 0 | 0 |
| 1 | 22 | 1 | 0 | 0 | 0 |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | |

COMPLETION 75 ↑
ALLOCATION 73 ↑

| BITS 0-4 COUNTING ENABLES | BIT 5 INTERRUPT ENABLES | BITS 6-15 | BIT 16 PMC1 INTERRUPT CONTROL | BIT 17 PMCn, n>1 COUNT CONTROL | BIT 18 PMCn, n>1 COUNT CONTROL | BITS 19-25 PMC1 EVENT SELECTION | BITS 26-31 PMC2 EVENT SELECTION |

MMCR0

FIG. 6B

| BITS 0-4 PMC3 EVENT SELECTION | BITS 5-9 PMC4 EVENT SELECTION | BITS 10-14 PMC5 EVENT SELECTION | BITS 15-19 PMC6 EVENT SELECTION | BITS 20-24 PMC7 EVENT SELECTION | BITS 25-28 PMC8 EVENT SELECTION | BIT 29 FCUIABR | BIT 30 UPDATING MODE PMC1 | BIT 31 UPDATING MODE PMCn, n>1 |

MMCR1

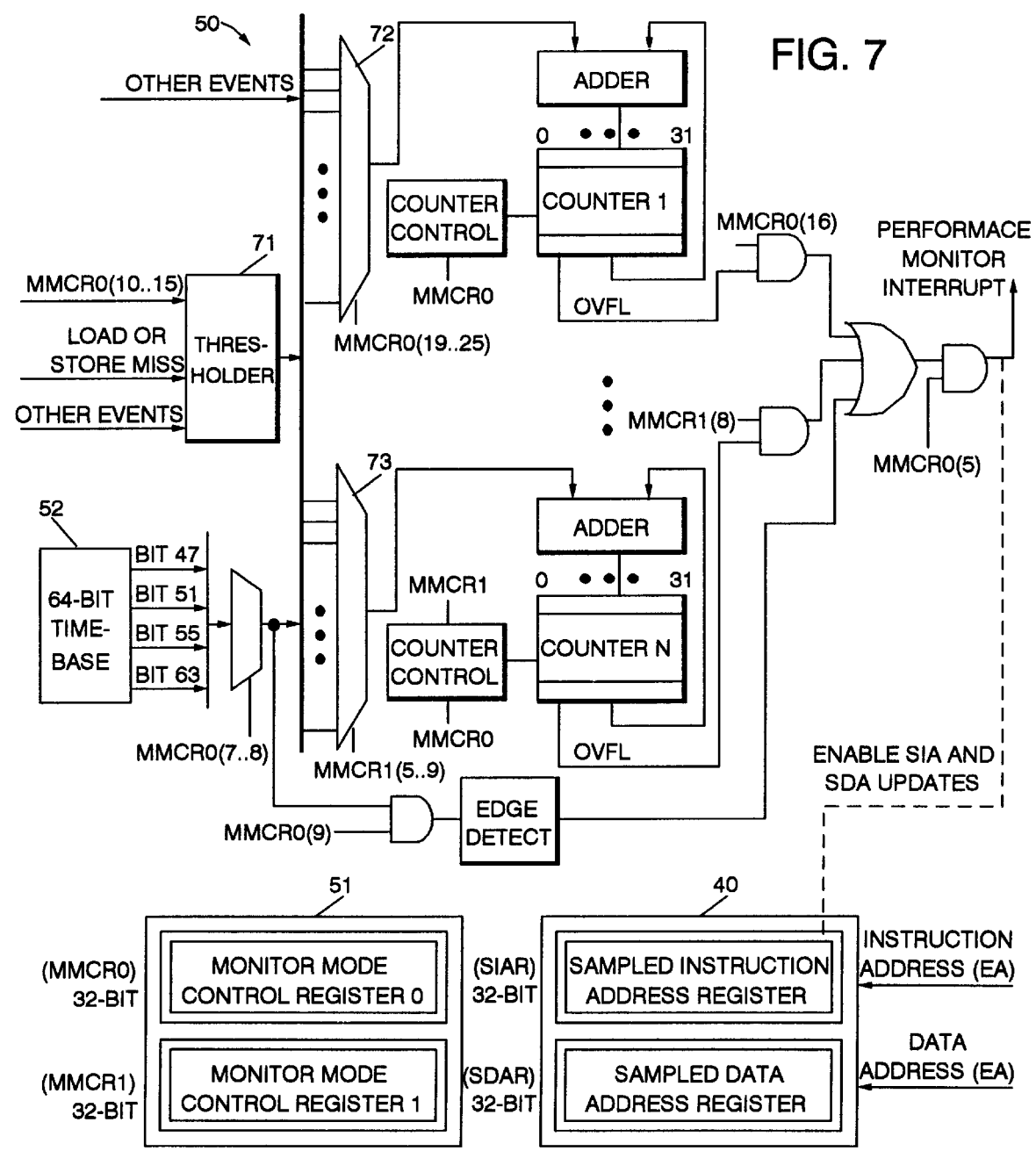

PERFORMANCE MONITOR

CROSS-REFERENCE TO RELATED APPLICATIONS

The present application is related to applications Ser. No. 08/497,242, entitled "Method and System for Halting Processor Execution in Response to an Enumerated Occurrence of a Selected Combination of Internal States," filed on Jun. 30, 1995, Ser. No. 08/485,953, entitled, "On-Chip Performance Monitoring with a Characterization of Locks/ Semaphore Utilization," filed on Jun. 7, 1995, Ser. No. 08/537,586, entitled "A Method and System for Performance Monitoring Through Identification of Frequency and Length of Time of Execution of Serialization Instructions in a Processing System," Ser. No. 08/537,645, entitled "A Method and System for Performance Monitoring Through Monitoring an Order of Processor Events During Execution in a Processing System," Ser. No. 08/538,071, entitled "A Method and System for Selecting and Distinguishing an Event Sequence Using an Effective Address in a Processing System, Ser. No. 08/539,023, entitled "A Method and System for Performance Monitoring Time Lengths of Disabled Interrupts in a Processing System," Ser. No. 08/538,102, entitled "A Method and System for Performance Monitoring Stalls to Identify Pipeline Bottlenecks and Stalls in a Processing System," Ser. No. 08/538,509, entitled "A Method and System for Performance Monitoring Efficiency of Branch Unit Operation in a Processing System," Ser. No. 08/536,492, entitled "A Method and System for Performance Monitoring of Misaligned Memory Accesses in a Processing System," Ser. No. 08/538,774, entitled "A Method and System for Performance Monitoring of Dispatch Stalls in a Processing System", and U.S. Pat. No. 5,691,920, entitled "A Method and System for Performance Monitoring of Dispatch Unit Efficiency in a Processing System," which are assigned to the assignee of the present application, and which are all hereby incorporated by reference herein.

TECHNICAL FIELD

The present invention relates in general to data processing systems, and in particular, to performance monitoring in data processing systems.

BACKGROUND INFORMATION

In typical computer systems utilizing processors, system developers desire optimization of execution software for more effective system design. Usually, studies of a program's access patterns to memory and interaction with a system's memory hierarchy are performed to determine system efficiency. Understanding the memory hierarchy behavior aids in developing algorithms that schedule and/or partition tasks, as well as distribute and structure data for optimizing the system.

Performance monitoring is often used in optimizing the use of software in a system. A performance monitor is generally regarded as a facility incorporated into a processor to monitor selected characteristics to assist in the debugging and analyzing of systems by determining a machine's state at a particular point in time. Often, the performance monitor produces information relating to the utilization of a processor's instruction execution and storage control. For example, the performance monitor can be utilized to provide information regarding the amount of time that has passed between events in a processing system. The information produced usually guides system architects toward ways of enhancing performance of a given system or of developing improvements in the design of a new system.

Prior art approaches to performance monitoring include the use of test instruments. Unfortunately, this approach is not completely satisfactory. Test instruments can be attached to the external processor interface, but these can not determine the nature of internal operations of a processor. Test instruments attached to the external processor interface cannot distinguish between instructions executing in the processor. Test instruments designed to probe the internal components of a processor are typically considered prohibitively expensive because of the difficulty associated with monitoring the many busses and probe points of complex processor systems that employ pipelines, instruction prefetching, data buffering, and more than one level of memory hierarchy within the processors. A common approach for providing performance data is to change or instrument the software. This approach however, significantly affects the path of execution and may invalidate any results collected. Consequently, software-accessible counters are incorporated into processors. Most software-accessible counters, however, are limited in the amount of granularity of information they provide.

Further, a conventional performance monitor is usually unable to capture machine state data until an interrupt is signaled, so that results may be biased toward certain machine conditions that are present when the processor allows interrupts to be serviced. Also, interrupt handlers may cancel some instruction execution in a processing system where, typically, several instructions are in progress at one time. Further, many interdependencies exist in a processing system, so that in order to obtain any meaningful data and profile, the state of the processing system must be obtained at the same time across all system elements. Accordingly, control of the sample rate is important because this control allows the processing system to capture the appropriate state. It is also important that the effect that the previous sample has on the sample being monitored is negligible to ensure the performance monitor does not affect the performance of the processor. Accordingly, there exists a need for a system and method for effectively monitoring processing system performance that will efficiently and noninvasively identify potential areas for improvement. A more effective performance monitoring system has been disclosed in the cross-referenced applications noted above.

There is a need in the art for further improvements in performance monitoring in data processing systems.

SUMMARY OF THE INVENTION

The present invention addresses the foregoing need by providing a performance monitor comprising a plurality of counters for counting various events occurring within the processing system. In one embodiment of the present invention, a code point is inserted within a control register of the performance monitor, whereby the code point notifies the performance monitor to begin counting a particular event. Generic code points may then be inserted into other control register locations pertaining to one or more of the other counters within the performance monitor, whereby these generic code points inform their associated counters to begin counting other parameters with respect to the event indicated within the first performance counter.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 3 is a conceptual illustration of a reorder buffer of the sequencer unit of FIG. 2;

FIGS. 6A and 6B illustrate monitor control registers (MMCRn) utilized to manage a plurality of counters;

FIG. 7 illustrates a block diagram of a performance monitor configured in accordance with the present invention.

DETAILED DESCRIPTION

Figure 1:
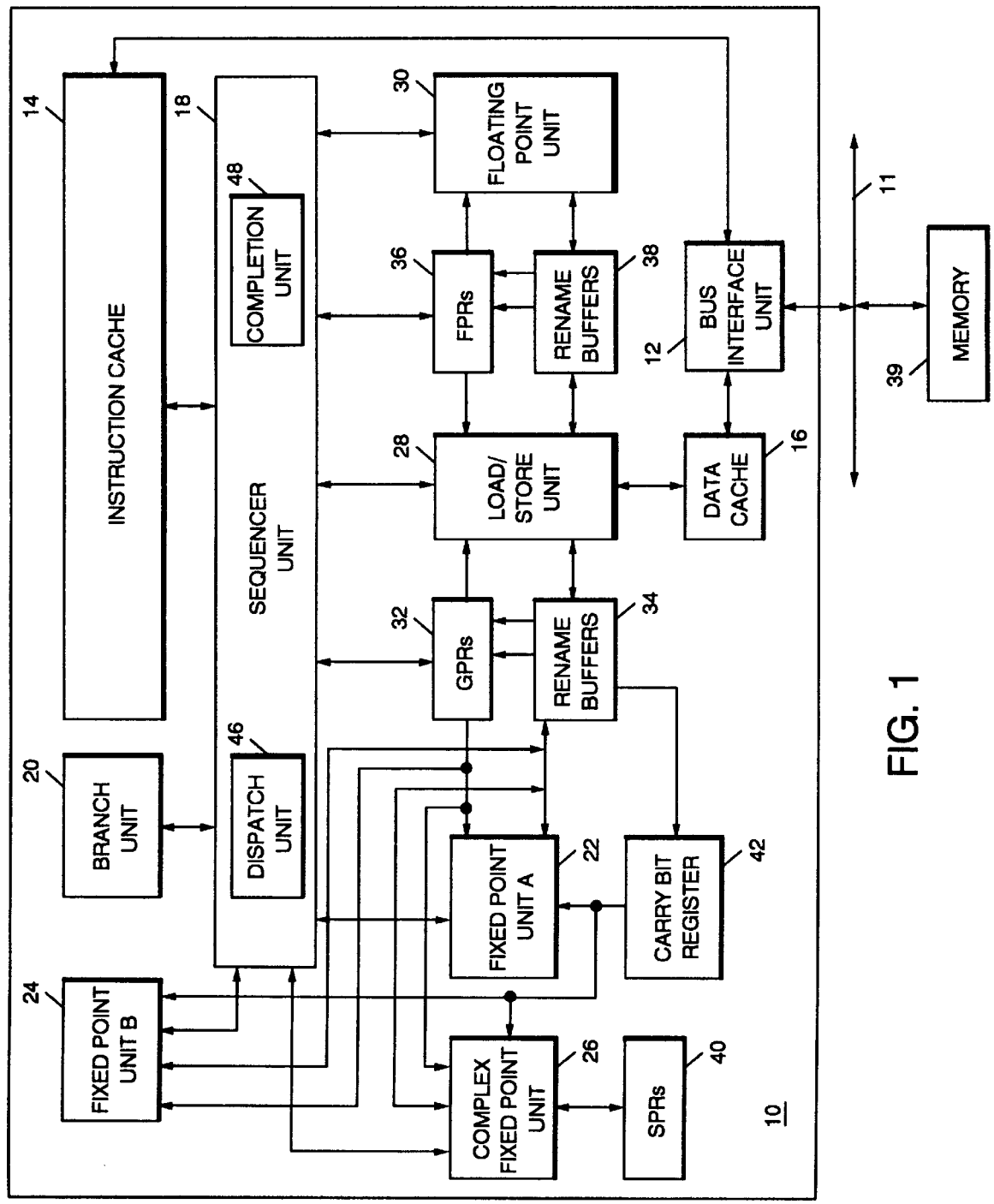
FIG. 1 is a block diagram of a processor for processing information in accordance with the present invention.

In the following description, numerous specific details are set forth such as specific word or byte lengths, etc., to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of a processor 10 system for processing information according to one embodiment. Processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11 information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". An instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Although it would be desirable for each instruction to take one machine cycle to complete each of the stages of instruction processing, in most implementations, there are some instructions (e.g., complex fixed point instructions executed by CFXU 26) that require more than one cycle. Accordingly, a variable delay may occur between a particular instruction's execution and completion stages in response to the variation in time required for completion of preceding instructions.

Figure 2:
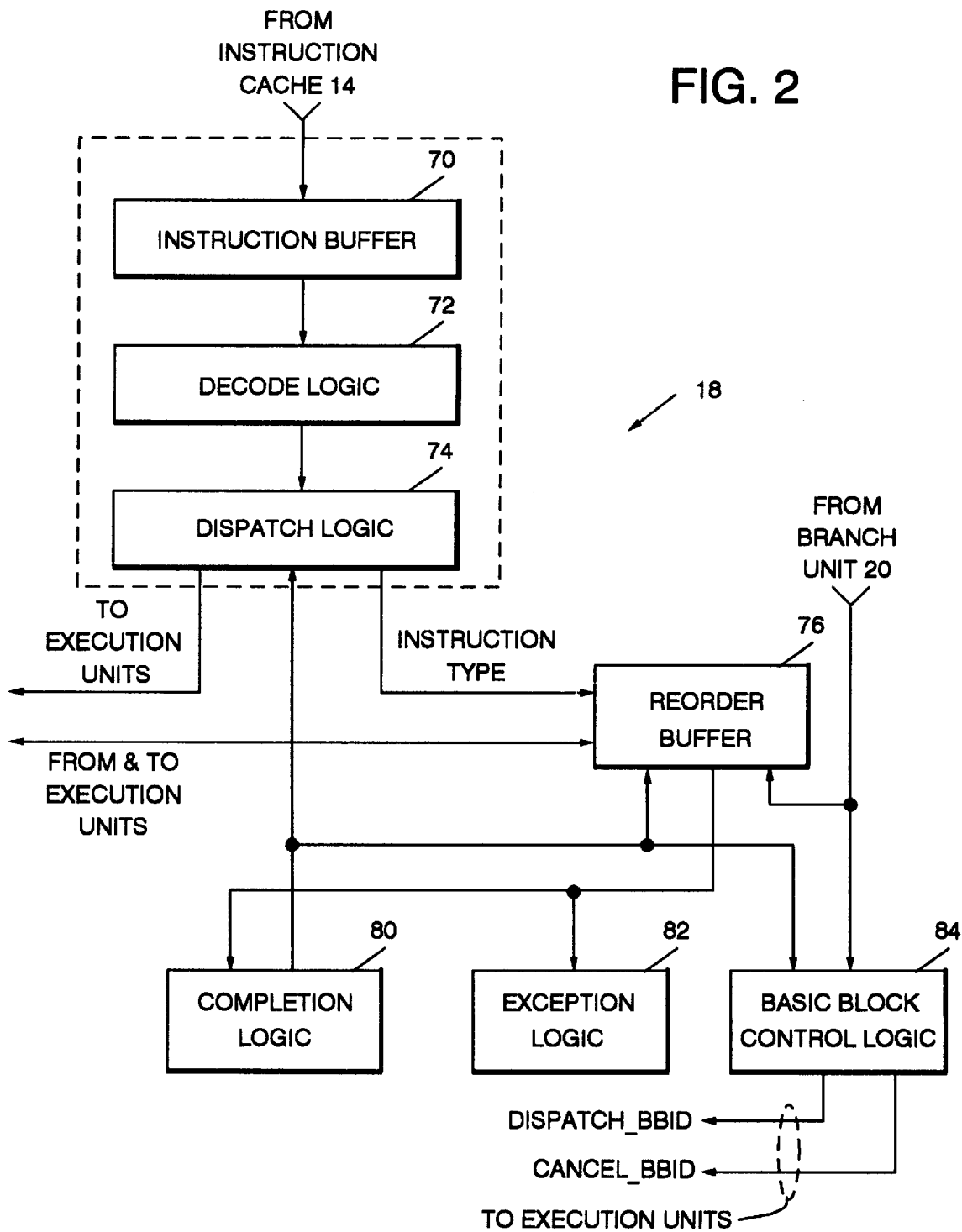
FIG. 2 is a block diagram of a sequencer unit of the processor of FIG. 1.

FIG. 2 is a block diagram of sequencer unit 18. As discussed further hereinabove, in the fetch stage, sequencer unit 18 selectively inputs up to four instructions from instructions cache 14 and stores such instructions in an instruction buffer 70. In the decode stage, decode logic 72 inputs and decodes up to four fetched instructions from instruction buffer 70. In the dispatch stage, dispatch logic 74 selectively dispatches up to four decoded instructions to selected (in response to the decoding in the decode stage) ones of execution units 20, 22, 24, 26, 28 and 30.

Figure 5:
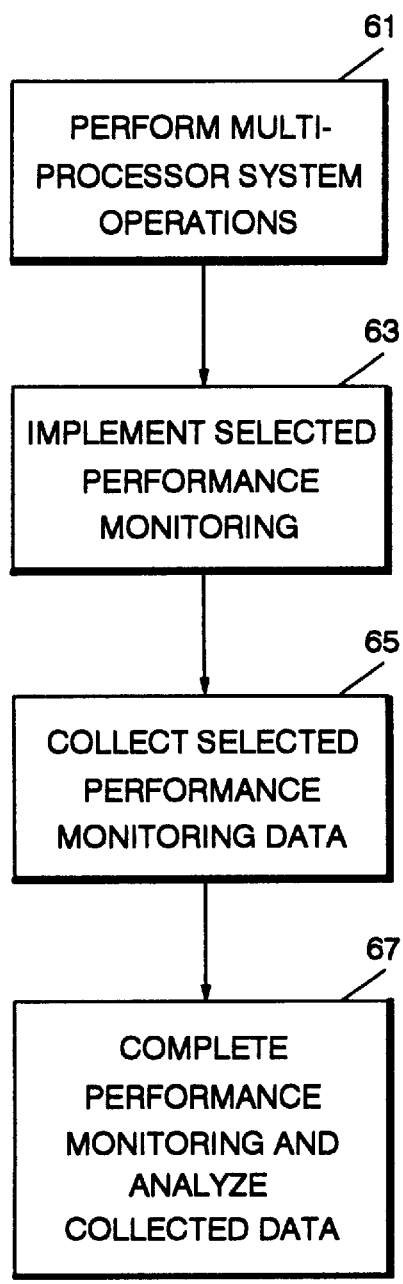
FIG. 5 is a block diagram of an overall process flow in accordance with the present invention of processing system operation including performance monitoring.

FIG. 3 is a conceptual illustration of a reorder buffer 76 of sequencer unit 18. As shown in FIG. 5, reorder buffer 76 has sixteen entries respectively labelled as buffer numbers 0–15. Each entry has five primary fields, namely an "instruction type" field, a "number-of-GPR destinations" field, a "number-of-FPR destinations" field, a "finished" field, and an "exception" field.

Referring also to FIG. 2, as dispatch logic 74 dispatches an instruction to an execution unit, sequencer unit 18 assigns the dispatched instruction to an associated entry in reorder buffer 76. Sequencer unit 18 assigns (or "associates") entries in reorder buffer 76 to dispatched instructions on a first-in first-out basis and in a rotating manner, such that sequencer unit 18 assigns entry 0, followed sequentially by entries 1–15, and then entry 0 again. As the dispatched instruction is assigned an associated entry in reorder buffer 76, dispatch logic 74 outputs information concerning the dispatched instruction for storage in the various fields and subfields of the associated entry in reorder buffer 76.

For example, in entry 1 of FIG. 3, reorder buffer 76 indicates the instruction is dispatched to FXUA 22. Entry 1 further indicates the dispatched instruction has one GPR destination register (such that "number-of-GPR destinations"=1), has zero FPR destination registers (such that "number-of-FPR destinations"=0), is not yet finished (such that "finished"=0), and has not yet caused an exception (such that "exception"=0).

As an execution unit executes a dispatched instruction, the execution unit modifies the instruction's associated entry in reorder buffer 76. More particularly, in response to finishing execution of the dispatched instruction, the execution unit modifies the entry's "finished" field (such that "finished"=1). If the execution unit encounters an exception during execution of the dispatched instruction, the execution unit modifies the entry's "exception" field (such that "exception"=1).

FIG. 3 shows an allocation pointer 73 and a completion pointer 75. Processor 10 maintains such pointers for controlling reading from and writing to reorder buffer 76.

Processor 10 maintains allocation pointer 73 to indicate whether a reorder buffer entry is allocated to (or "associated with") a particular instruction. As shown in FIG. 3, allocation pointer 73 points to reorder buffer entry 3, thereby indicating that reorder buffer entry 3 is the next reorder buffer entry available for allocation to an instruction.

Also, processor 10 maintains completion pointer 75 to indicate (for a reorder buffer entry previously allocated to a particular instruction) whether the particular instruction satisfies the following conditions:

Condition 1—The execution unit (to which the instruction is dispatched) finishes execution of the instruction;

Condition 2—No exceptions were encountered in connection with any stage of processing the instruction; and Condition 3—Any previously dispatched instruction satisfies Condition 1 and Condition 2.

As shown in FIG. 3, completion pointer 75 points to reorder buffer entry 1, thereby indicating that reorder buffer entry 1 is the next reorder buffer entry capable of satisfying Conditions 1, 2 and 3. Accordingly, "valid" reorder buffer entries can be defined as the reorder buffer entry pointed to by completion buffer 75 and its subsequent reorder buffer entries that precede the reorder buffer entry pointed to by allocation pointer 73.

Referring again to FIG. 2, the entries of reorder buffer 76 are read by completion logic 80 and exception logic 80 of sequencer unit 18. In response to the "exception" fields of reorder buffer 76, exception logic 82 handles exceptions encountered during execution of dispatched instructions. In response to the "finished" fields and "exception" fields of reorder buffer 76, completion logic 80 indicates "completion" of instructions in order of their programmed sequence. Completion logic 80 indicates "completion" of an instruction if it satisfies the following conditions.

Condition 1—The execution unit (to which the instruction is dispatched) finishes execution of the instruction (such that "finished"=1 in the instruction's associated entry in reorder buffer 76);

Condition 2—No exceptions were encountered in connection with any stage of processing the instruction (such that "exception"=0 in the instruction's associated entry in reorder buffer 76); and Condition 3—Any previously dispatched instruction satisfies Condition 1 and Condition 2.

In response to information in reorder buffer 76, dispatch logic 74 determines a suitable number of additional instructions to be dispatched.

Figure 4:
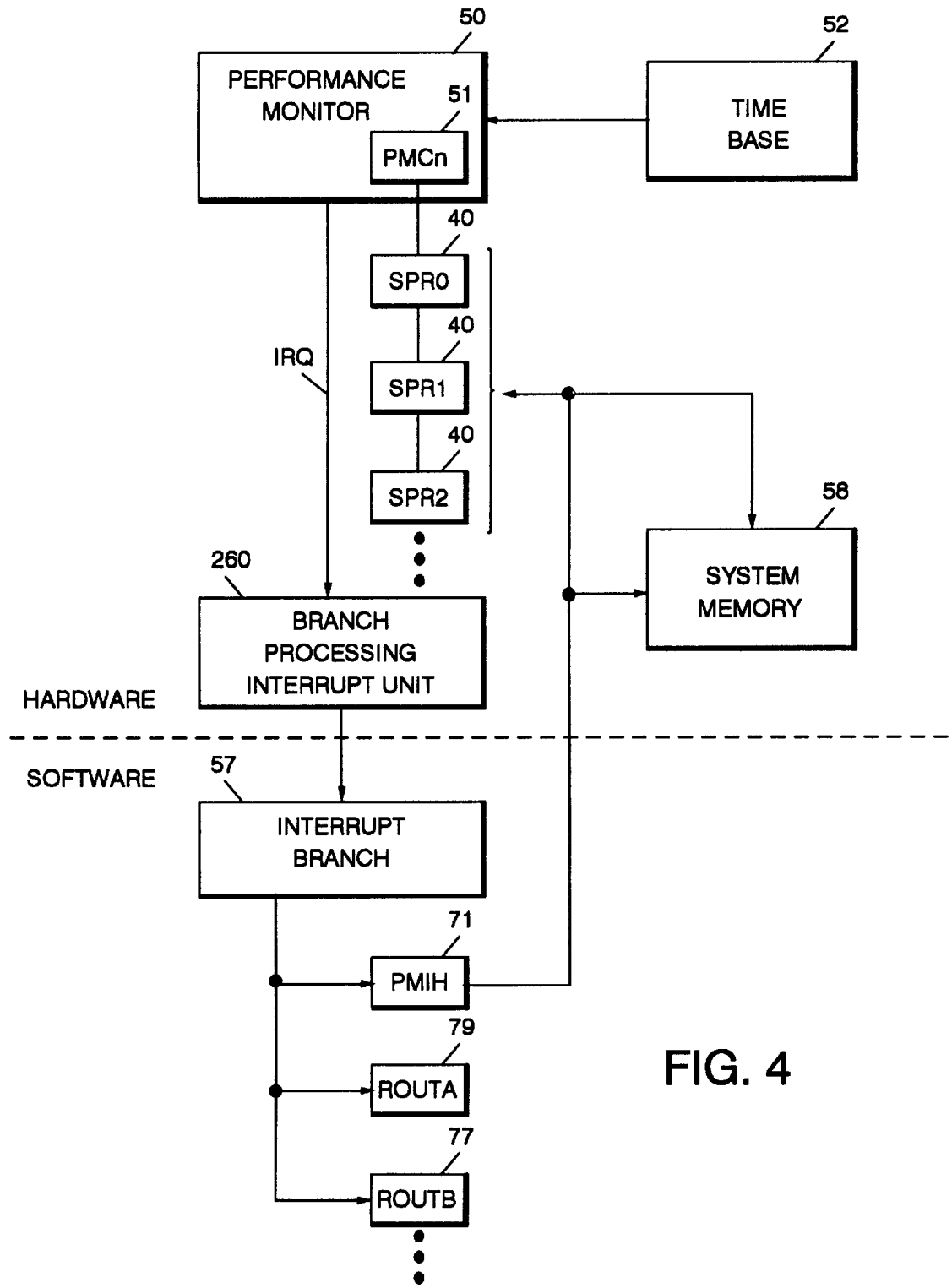
FIG. 4 is a block diagram of a performance monitoring aspect of the present invention.

Referring to FIG. 4, a feature of processor 10 is performance monitor (PM) 50. Performance monitor 50 is a software-accessible mechanism intended to provide detailed information with significant granularity concerning the utilization of PowerPC instruction execution and storage control. Generally, the performance monitor 50 includes an implementation-dependent number (e.g., 2–8) of counters 51, e.g, PMC1–PMC8, used to count processor/storage related events. Further included in performance monitor 50 are monitor mode control registers (MMCRn) that establish the function of the counters PMCn, with each MMCR usually controlling some number of counters. Counters PMCn and registers MMCRn are typically special purpose registers physically residing on the processor 10, e.g., a PowerPC. These special purpose registers are accessible for read or write via mfspr (move from special purpose register) and mtspr (move to special purpose register) instructions, where the writing operation is allowed in a privileged or supervisor state, while reading is allowed in a problem state since reading the special purpose registers does not change the register's content. In a different embodiment, these registers may be accessible by other means such as addresses in I/O space.

The MMCRn registers are partitioned into bit fields that allow for event/signal selection to be recorded/counted. Selection of an allowable combination of events causes the counters to operate concurrently.

The MMCRn registers include controls, such as counter enable control, counter negative interrupt controls, counter event selection, and counter freeze controls, with an implementation-dependent number of events that are selectable for counting. Smaller or larger counters and registers may be utilized to correspond to a particular processor and bus architecture or an intended application, so that a different number of special purpose registers for MMCRn and PMCn may be utilized without departing from the spirit and scope of the present invention.

The performance monitor 50 is provided in conjunction with a time base facility 52 which includes a counter that designates a precise point in time for saving the machine state. The time base facility 52 includes a clock with a frequency that is typically based upon the system bus clock and is a required feature of a superscalar processor system including multiple processors 10 to provide a synchronized time base. The time base clock frequency is provided at the frequency of the system bus clock or some fraction, e.g., ¼, of the system bus clock.

Predetermined bits within a 64-bit counter included in the time base facility 52 are selected for monitoring such that the increment of time between monitored bit flips can be controlled. Synchronization of the time base facility 52 allows all processors in a multiprocessor system to initiate operation in synchronization. Examples of methods for performing such synchronization are provided in co-pending U.S. patent application Ser. No. 08/675,427, entitled "Performance Monitoring in a Multiprocessor System With Interrupt Masking", assigned to an assignee of the present invention and incorporated herein by reference in its entirety.

Time base facility 52 further provides a method of tracking events occurring simultaneously on each processor of a multiprocessor system. Since the time base facility 52 provides a simple method for synchronizing the processors, all of the processors of a multiprocessor system detect and react to a selected single system-wide event in a synchronous manner. The transition of any bit or a selected one of a group of bits may be used for counting a condition among multiple processors simultaneously such that an interrupt is signalled when a bit flips or when a counted number of events has occurred.

In operation, a notification signal is sent to PM 50 from time base facility 52 when a predetermined bit is flipped. The PM 50 then saves the machine state values in special purpose registers. In a different scenario, the PM 50 uses a "performance monitor" interrupt signalled by a negative counter (bit zero on) condition. The act of presenting the state information including operand and address data may be delayed if one of the processors has disabled interrupt handling.

In order to ensure that there is no loss of data due to interrupt masking, when the interrupt condition is signaled, the processors capture the effective instruction and operand (if any) addresses of "an" instruction in execution and present an interrupt to the interrupt resolution logic 57, which employs various interrupt handling routines 71, 77, 79. These addresses are saved in registers, Saved Data Address (SDAR) and Saved Instruction Address (SIAR), which are designated for these purposes at the time of the system-wide signaling. The state of various execution units are also saved. This state of various execution units at the time the interrupt is signalled is provided in a saved state register (SSR). This SSR could be an internal register or a software accessible SPR. Thus, when the interrupt is actually serviced, the content of these registers provide the information concerning current instructions that are currently executing in the processor at the time of the signaling.

When the PM 50 receives the notification from time base 52 to indicate that it should record "sample data", an interrupt signal is output to a branch processing unit 20. Concurrently, the sample data (machine state data) is placed in SPRs 40 including the SIAR, SDAR and SSR which are suitably provided as registers or addresses in I/O space. A flag may be used to indicate interrupt signalling according to a chosen bit transition as defined in the MMCRn. of course, the actual implementation of the time base facility 52 and the selected bits is a function of the system and processor implementation.

A block diagram, as shown in FIG. 5, illustrates an overall process flow in accordance with the present invention of superscalar processor system operation including performance monitoring. The process begins in block 61 with the processing of instructions within the superscalar processor system. During the superscalar processor system operation, performance monitoring is implemented in a selected manner via block 63 through configuration of the performance monitor counters by the monitor mode control registers and performance monitoring data is collected via block 65.

By adjusting the values of the performance monitor counts, that is by setting the values of the counters high enough so that an exception is signalled by some predetermined number of occurrences of an event, a profile of system performance can be obtained. Further, for purposes of this disclosure, a performance monitoring interrupt preferably occurs at a selectable point in the processing. As described in more detail below, a predetermined number of events is suitably used to select the stop point. For example, counting can be programmed to end after two instructions by causing the counter to go negative after the completion of two instructions. Further, for purposes of this disclosure, the time period during which monitoring occurs is known. Thus, the data collected has a context in terms of the number of minutes, hours days, etc. over which the monitoring is performed.

As described herein below, selected performance monitoring includes reconstructing a relationship among events, identifying false triggering, identifying bottlenecks, monitoring stalls, monitoring idles, determining the efficiency of operation of a dispatch unit, determining the effectiveness of branch unit operations, determining a performance penalty of misaligned data accesses, identifying a frequency of execution of serialization instructions, identifying inhibited interrupts, and applying Little's Law to identify efficiency.

The selected performance monitoring routine is completed and the collected data is analyzed via block 67 to identify potential areas of system enhancements. A profiling mechanism, such as a histogram, may be constructed with the data gathered to identify particular areas in the software or hardware where performance may be improved. Further for those events being monitored that are time sensitive, e.g., a number of stalls, idles, etc., the count number data is collected over a known number of elapsed cycles, so that the data has a context in terms of a sampling period. It should be appreciated that analysis of collected data may be facilitated using such tools as "aixtrace" or a graphical performance visualization tool "pv", each of which is available from IBM Corporation.

In FIG. 6a, an example representation of one configuration of MMCR0 suitable for controlling the operation of two PMC counters, e.g., PMC1 and PMC2, is illustrated. As shown in the example, MMCR0 is partitioned into a number of bit fields whose settings select events to be counted, enable performance monitor interrupts, specify the conditions under which counting is enabled, and set a threshold value (X).

The threshold value (X) is both variable and software selectable and its purpose is to allow characterization of certain data, such that by accumulating counts of accesses that exceed decreasing threshold values, designers gain a clearer picture of conflicts. The threshold value (X) is considered exceeded when a decrementer reaches zero before the data instruction completes. Conversely, the threshold value is not considered exceeded if the data instruction completes before the decrementer reaches zero, of course, depending on the data instruction being executed, completed has different meanings. For example, for a load instruction, "completed" indicates that the data associated with the instruction was received, while for a "store" instruction, "completed" indicates that the data was successfully written. A user readable counter, e.g., PMC1, suitably increments every time the threshold value is exceeded.

A user may determine the number of times the threshold value is exceeded prior to the signalling of performance monitor interrupt. For example, the user may set initial values for the counters to cause an interrupt on the 100th data miss that exceeds the specified threshold. With the appropriate values, the PM facility is readily suitable for use in identifying system performance problems.

Referring to FIG. 6a, as illustrated by this example, bits 0–4 and 18 of the MMCR0 determine the scenarios under which counting is enabled. By way of example, bit 0 is a freeze counting bit (FC). When at a high logic level (FC=1), the values in PMCn counters are not changed by hardware events, i.e., counting is frozen. When bit 0 is at a low logic level (FC=0), the values of the PMCn can be changed by chosen hardware events. Bits 1–4 indicate other specific conditions under which counting is frozen.

For example, bit 1 is a freeze counting while in a supervisor state (FCS) bit, bit 2 is a freeze counting while in a problem state (FCP) bit, bit 3 is a freeze counting while PM=1 (FCPM1) bit, and bit 4 is a freeze counting while PM=0 (FCPM0) bit. PM represents the performance monitor marked bit, bit 29, of a machine state register (MSR) (SPR 40, FIG. 1) . For bits 1 and 2, a supervisor or problem state is indicated by the logic level of the PR (privilege) bit of the MSR. The states for freezing counting with these bits are as follows: for bit 1, FCS=1 and PR=0; for bit 2, FCP=1 and PR=1; for bit 3, FCPM1=1 and PM=1; and for bit 4, FCPM0=1 and PM=0. The state for allowing counting with these bits are as for bit 1, FCS=1 and PR=1; for bit 2, FCP=1 and PR=0; for bit 3, FCPM1=1 and PM=0; and for bit 4, FCPMO=1 and PM=1.

Bits 5, 16, and 17 are utilized to control interrupt signals triggered by PMCn. Bits 6–9 are utilized to control the time or event-based transitions. The threshold value (X) is variably set by bits 10–15. Bit 18 control counting enablement for PMCn, n>1, such that when low, counting is enabled, but when high, counting is disabled until bit 0 of PMC1 is high or a performance monitoring exception is signaled. Bits 19–25 are used for event selection, i.e, selection of signals to be counted, for PMC1.

FIG. 6b illustrates a configuration of MMCR1 in accordance with an embodiment of the present invention. Bits 0–4 suitably control event selection for PMC3, while bits 5–9 control event selection for PMC4. Similarly, bits 10–14 control event selection for PMC5, bits 15–19 control event selection for PMC6, bits 20–24 control event selection for PMC7, and bits 25–28 control event selection for PMC8.

The counter selection fields, e.g., bits 19–25 and bits 26–31 of MMCR0 and bits 0–28 of MMCR1, preferably have as many bits necessary to specify the full domain of selectable events provided by a particular implementation.

At least one counter is required to capture data for performance analysis. More counters provide for faster and more accurate analysis. If the scenario is strictly repeatable, the same scenario may be executed with different items being selected. If the scenario is not strictly repeatable, then the same scenario may be run with the same item selected multiple times to collect statistical data. The time from the start of the scenario is assumed to be available via system time services so that intervals of time may be used to correlate the different samples and different events.

U.S. patent application Ser. No. 08/537,417, entitled "A Method and System for Performance Monitoring Time Lengths of Instruction Execution in a Processing System," which is hereby incorporated by reference herein, further discusses selecting and distinguishing an event sequence using an effective address, performance monitoring through monitoring an order of processor events during execution, performance monitoring to identify bottlenecks and stalls, performance monitoring of the effect of memory accesses on a processor system, performance monitoring of dispatch unit deficiency, performance monitoring of idles, performance monitoring of misaligned memory accesses, performance monitoring of serialization instructions, performance monitoring of efficiency of branch unit operation, performance monitoring of time lengths of disabled interrupts, and performance monitoring of the time lengths of instruction execution. For further discussion of performance monitoring, please refer to Chapter 9, *Performance Monitor, PowerPC 604 RISC Microprocessor User's Manual*, pp. 9–1 through 9–11, IBM 1994, which is hereby incorporated by reference herein. In this reference, there are a couple of tables indicating code points for storage within the MMCRn registers, such as the registers illustrated in FIGS. 6a and 6b, which notify the various counters PMCn what events to monitor and in what fashion. The monitoring of events by these counters is performed independently of each other. For example, if PMC1 is programmed to count Load requests that exceed a designated threshold, and PMC2 is programmed to count the total number of Load requests occurring, and if PMC1 is thereafter programmed to count Store requests that exceed a threshold, then if it is desired to count the total number of Store requests using PMC2, the code point for PMC2 would also have to be reprogrammed.

The present invention is designed to eliminate this inefficiency by providing for generic code points that may be programmed into one or more of the counters so that they will be able to perform a specific counting function relative to an event designated within a particular counter, such as PMC1, and will continue to perform these counting functions relative to the event designated for PMC1 even when the code point for PMC1 is reprogrammed to be dependent upon a different event. For example, If PMC1 is programmed with a code point to count Load requests that exceed a certain designated threshold, and PMC2 is programmed with a generic code point in accordance with the present invention so that PMC2 counts the total number of Load requests, then when PMC1 is reprogrammed using one of the MMCRn registers to then count Store requests that exceed a designated threshold, PMC2 will thereafter count the total number of Store requests without its code point in its associated MMCRn register being reprogrammed also.

Figure 8:
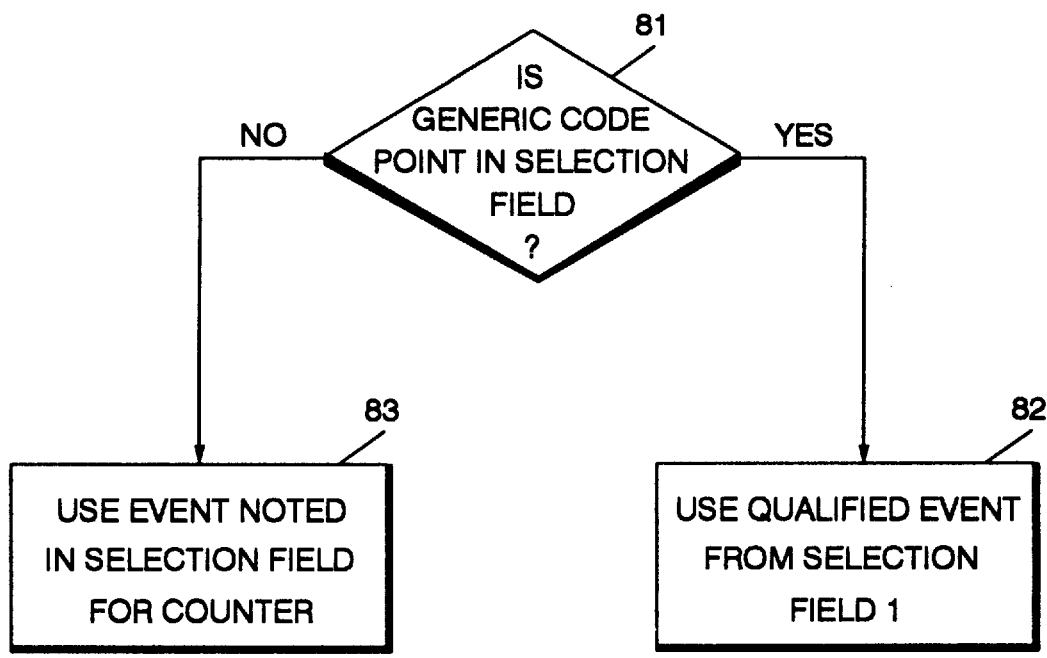
FIG. 8 illustrates a flow diagram in accordance with the present invention.

Referring next to FIGS. 7 and 8, there is illustrated an embodiment for implementing the foregoing invention. FIG. 7 illustrates performance monitor 50 having a couple of MMCRn registers 51 shown, SIAR and SDAR registers 40, PMC1 . . . PMCn (noted as Counters 1 . . . N) with their associated adders and counter control logic being fed by multiplexer 72 . . . 73 controlled by various bits of the MMCRn registers. Multiplexer 72 . . . 73 receive events from thresholder 71, time base circuitry 52 and from other events, which are signals originating from various execution units and other units within the microprocessor. All of these various circuit elements of performance monitor 50 are discussed herein and in the cross-referenced patent applications indicated above, and therefore further detailed discussion into the operation of these elements is not provided.

FIG. 8 illustrates a flow diagram of one implementation of the present invention, which may be embodied as logic circuitry within one or more of the counter control circuits associated with each one of PMC1 . . . PMCn.

A typical usage of the present invention would be to assign a specific selection code for PCM2 to count the number of cycles of an event selected in PCM1. This replaces the edge versus level approach implemented in the PowerPC 620 processor, which used a separate code point for each occurrence of an event that required both the number of occurrences and the number of cycles of duration. Thus, if the count cycles code point for that item selected in PCM1 is chosen for PCM2, and PCM1 is counting sync instructions, then PCM2 would be counting the total number of instructions counting sync instructions.

As one example of the present invention, PMC1 receives its event selection information from bits 19–25 of MMCR0 (FIG. 6a), which may designate that PMC1 count the number of Load requests that exceed a certain threshold designated within thresholder 71. This may be performed by programming into bits 19–25 of MMCR0 a predesignated code point for selecting such an event. PMC2 may be programmed by bits 26–31 within MMCR0 to count the total number of events selected by PMC1, which in this case is the total number of Load requests. This may be accomplished by programming bits 26–31 of MMCR0 with a generic code point within that selection field of bits 26–31. Within counter control logic of PMC2, in step 81, there is a determination of whether or not the code point stored within bits 26–31 is a generic code point. If the stored code point is a generic code point, then the process proceeds to step 82 to use the qualified event noted within selection field 1 (bits 19–25 of MMCR0). In other words, PMC2 will count the total number of Load requests, since it has been programmed to count the total number of events designated by the selection code point stored within bits 19–25. If the selection field of bits 19–25 of MMCR0 is thereafter reprogrammed to count the number of Store requests that exceed a certain designated threshold, then if the code point in bits 26–31 of MMCR0 has not been reprogrammed from the previously programmed generic code point, then PMC2 will thereafter count the total number of Store requests, since "Store requests" is the new event designated within bits 19–25 of MMCR0.

Note, if the code point stored within bits 26–31 of MMCR0 is not one of a predesignated generic code points, then the counter control logic associated with PMC2 will proceed to step 83 to perform a particular count function specifically associated with the non-generic code point stored within that selection field of MMCR0.

The following is another example demonstrating an implementation of the present invention. First, a tagged event to be counted in PMC1 is identified, and PMC1 counts the total number of these tagged events. Then, a single selection code is created for PMC2 which only counts those tagged items as identified by the PMC1 selection code, which exceed a specified threshold. Then a single selection code can be created and programmed into bits 0–4 of MMCR1 for program counter 3 to count the total time spent executing tagged events counted in PMC1. Further, a single selection code may be programmed into bits 5–9 of MMCR1 for PMC4 to count the total time spent executing tagged events that exceed the threshold counted in PMC1.

As another example, generic code points A–F could be programmed into monitor mode control registers to implement different counts on different counters or on the same counters. For example, a variable event can be counted in PMC1, then, generic code point A can be programmed into an MMCR to count the number of occurrences of the event in a processor unit 0 (e.g., an execution unit). Then, a generic code point B can be programmed so that another PMC counts the number of occurrences of the event in processor unit 1, a generic code point C can be programmed into an MMCR bit field so that a corresponding PMC will count the number of cycles executing on the event in processor unit 0, another PMC may be programmed by a generic code point D to count the number of cycles for executing the event in processor unit 1, and a generic code point E can be programmed so that a corresponding PMC counts the number of cycles executing the event in both processor units 0 and 1 at the same time, while yet another generic code point F can be programmed so that the number of events being executed in both processor units 0 and 1 can be counted at the same time.

Although the present invention and its advantages have been described in detail, it should be understood that various changes, substitutions and alterations can be made herein without departing from the spirit and scope of the invention as defined by the appended claims.

What is claimed is:

1. A performance monitor for a data processing system, comprising:
   a first counter programmable for counting a number of first events occurring with respect to a first operation performed within said data processing system;
   a second counter programmable for counting a number of second events occurring with respect to said first operation performed within said data processing system;
   circuitry for subsequently reprogramming said first counter to count a number of designated events occurring with respect to a second operation performed within said data processing system; and
   circuitry for enabling said second counter to count said number of second events occurring with respect to said second operation performed within said data processing system automatically without having to be reprogrammed.

2. The performance monitor as recited in claim 1, wherein said first counter is programmed through code points stored within a first selection bit field in a first programmable register, and wherein said second counter is programmed through code points stored within a second selection bit field in either said first programmable register or a second programmable register.

3. A method for performance monitoring in a data processing system, comprising the steps of:
   programming a first counter for counting a number of first events occurring with respect to a first operation performed within said data processing system;
   programming a second counter for counting a number of second events occurring with respect to said first operation performed within said data processing system;
   reprogramming said first counter to count a number of designated events occurring with respect to a second operation performed within said data processing system; and
   counting by said second counter said number of second events occurring with respect to said second operation performed within said data processing system automatically without said second counter having to be reprogrammed.

4. The method as recited in claim 3, wherein said programming of said first counter further comprises the step of programming code points in a first selection bit field in a first programmable register, and wherein said programming of said second counter comprises the step of programming code points in a second selection bit field in either said first programmable register or a second programmable register.

5. The method as recited in claim 4, wherein said first and said second selection bit fields may reside in the same or different programmable registers.

6. A data processing system comprising:
   a processor coupled to a system memory by a system bus, said processor further comprising various execution units operable for performing various operations within said data processing system, said processor further comprising a performance monitor comprising:
      a first counter programmable for counting a number of first events occurring with respect to a first operation performed within said data processing system; and
      a second counter programmable for counting a number of second events occurring with respect to said first operation performed within said data processing system,
   wherein when said first counter is subsequently reprogrammed to count a number of designated events occurring with respect to a second operation performed within said data processing system, said second counter will count said number of second events occurring with respect to said second operation performed within said data processing system, wherein said second counter counts said number of second events occurring with respect to said second operation performed within said data processing system automatically without having to be reprogrammed.

* * * * *